(12) United States Patent
Gumpoltsberger

(10) Patent No.: US 7,566,284 B2
(45) Date of Patent: Jul. 28, 2009

(54) MULTI-SPEED TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 320 days.

(21) Appl. No.: 11/705,115

(22) Filed: Feb. 9, 2007

(65) Prior Publication Data

US 2007/0191176 A1 Aug. 16, 2007

(30) Foreign Application Priority Data

Feb. 14, 2006 (DE) ........................ 10 2006 006 649

(51) Int. Cl.
  *F16H 3/62* (2006.01)
  *F16H 3/44* (2006.01)
(52) U.S. Cl. ........................ 475/276; 475/280; 475/282; 475/286
(58) Field of Classification Search .......... 475/275–292
  See application file for complete search history.

(56) References Cited

U.S. PATENT DOCUMENTS

| 3,956,946 | A | * | 5/1976 | Murakami et al. ........... 475/276 |
| 4,395,925 | A | | 8/1983 | Gaus |
| 5,106,352 | A | | 4/1992 | Lepelletier |
| 5,588,929 | A | * | 12/1996 | Benford ....................... 475/276 |
| 6,139,463 | A | | 10/2000 | Kasuya et al. |
| 6,217,474 | B1 | * | 4/2001 | Ross et al. ................... 475/269 |
| 6,558,287 | B2 | | 5/2003 | Hayabuchi et al. |
| 6,572,507 | B1 | | 6/2003 | Korkmaz et al. |
| 6,634,980 | B1 | | 10/2003 | Ziemer |
| 6,773,371 | B2 | * | 8/2004 | Lee et al. ..................... 475/296 |
| 6,860,831 | B2 | | 3/2005 | Ziemer |
| 7,018,319 | B2 | | 3/2006 | Ziemer |
| 2003/0139246 | A1 | * | 7/2003 | Sugiura et al. .............. 475/279 |
| 2008/0064557 | A1 | * | 3/2008 | Foeller et al. ............... 475/280 |

FOREIGN PATENT DOCUMENTS

| DE | 29 36 969 | 4/1981 |
| DE | 199 12 480 | 9/2000 |
| DE | 199 49 507 | 4/2001 |
| DE | 101 15 983 | 10/2002 |
| DE | 101 15 987 | 10/2002 |
| DE | 102 13 820 | 10/2002 |
| EP | 0 434 525 | 6/1991 |

* cited by examiner

*Primary Examiner*—Roger Pang
(74) *Attorney, Agent, or Firm*—Davis & Bujold, P.L.L.C.

(57) ABSTRACT

A multi-speed transmission with forward and reverse gears having input and output shafts, planetary gearsets, rotatable shafts and control elements. The input shaft can be detachably connected to shaft (6) by clutch (16); clutch (13) to shaft (3), and clutch (14) to shaft (4). The shaft (6) is permanently connected to the sun gear of the second planetary gearset and the sun gear of the third planetary gearset. Shaft (3) is permanently connected to the carrier of the second planetary gearset and the ring gear of the third planetary gearset; coupled to the housing via brake (03). Shaft (4) is permanently connected to the sun gear of the first planetary gearset and can be coupled to the housing via the brake (04). Shaft (5) is permanently connected to the carrier of the first planetary gearset and the ring gear of the second planetary gearset and the output shaft (2) is permanently connected to the carrier of the third planetary gearset and the ring gear of the first planetary gearset is non-rotatably connected to the housing via a shaft (0).

23 Claims, 3 Drawing Sheets

| | 1 | 2 | 3 | 4 | 5 | 6 | R1 |
|---|---|---|---|---|---|---|---|
| i_G | 3.521 | 2.041 | 2.481 | 1.000 | 1.691 | 0.587 | -3.909 |
| phi | 5.977 | 1.725 | 1.379 | 1.481 | 1.448 | 1.177 | -1.110 |
| 03 | X | | | | | | X |
| 04 | | X | | | | X | |
| 13 | | | | X | X | X | |
| 14 | | | X | | X | | X |
| 16 | X | X | X | X | | | |

MULTI-SPEED TRANSMISSION

This application claims priority from German Application Serial No. 10 2006 006 649.9 filed Feb. 14, 2006.

FIELD OF THE INVENTION

The present invention relates to a multi-speed transmission in planetary design, particularly an automatic transmission for a motor vehicle.

BACKGROUND OF THE INVENTION

According to the state of the art, automatic transmissions, particularly for motor vehicles, comprise planetary gearsets, which are shifted using friction and/or control elements, such as clutches and brakes, and which are typically connected to a starting element that is subject to a slip effect and optionally provided with a lock-up clutch, for example a hydrodynamic torque converter or a fluid clutch.

A transmission of this type is described in EP 0 434 525 A1. It substantially comprises one input shaft and one output shaft, which are disposed parallel to each other, a double planetary gearset concentric with the output shaft and five control elements in the form of three clutches and two brakes, the selective operation of which, in pairs, determines the different gear ratios between the input shaft and output shaft. This transmission has a front-mounted gearset and two power paths, so that six forward gears are obtained by selective engagement in pairs of the five control elements.

In the first power path, two clutches are required for transmitting the torque from the front-mounted gearset to two elements of the double planetary gearset. These elements are substantially provided in the direction of power flow behind the front-mounted gearset in the direction of the double planetary gearset. In the second power path, a further clutch is provided, which detachably connects this path with a further element of the double planetary gearset. The clutches are arranged such that the inner disk carrier forms the output end.

Furthermore, from the published prior art U.S. Pat. No. 6,139,463 a compact multi-speed transmission in planetary design, particularly for a motor vehicle is known, which has two planetary gearsets and one front-mounted gearset as well as three clutches and two brakes. In this known multi-speed transmission, two clutches C-1 and C-3 are provided in a first power path for transmitting the torque from the front-mounted gearset to the two planetary gearsets. The outer disk carrier and/or the cylinder or piston and pressure compensation sides of the clutch C-3 are connected to a first brake B-1. Furthermore, the inner disk carrier of the third clutch C-3 is connected to the cylinder and/or piston and pressure compensation sides of the first clutch C-1. The inner disk carrier of the first clutch C-1 is arranged on the output side and connected to a sun gear of the third planetary gearset.

From DE 199 49 507 A1 by the Applicant, a multi-speed transmission is also known, of which on the drive shaft two non-shiftable, front-mounted gearsets are provided, which on the output side generate two rotational speeds. In addition to the rotational speed of the input shaft, it selectively switched by closing the control elements to a shiftable double planetary gearset acting upon the output shaft such that, for changing from one gear to the next higher or lower gear of the two actuated control elements, only one control element must be engaged or disengaged.

DE 199 12 480 A1 discloses an automatically shiftable motor vehicle transmission with three spider-mounted planetary gearsets as well as three brakes and two clutches for switching between six forward gears and one reverse gear and with one drive shaft and one output shaft. The automatically shiftable motor vehicle transmission is configured such that the drive shaft is directly connected to the sun gear of the second planetary gearset and that the drive shaft can be connected via the first clutch to the sun gear of the first planetary gearset and/or via the second clutch to the spider of the first planetary gearset. Additionally or alternatively, the sun gear of the first planetary gearset can be connected via the first brake to the transmission housing and/or the spider of the first planetary gearset can be connected via the second brake to the housing and/or to the sun gear of the third planetary gearset, via the third brake.

DE 102 13 820 A1 discloses a multi-speed automatic transmission, comprising a first input path T1 of a first speed ratio, an input path T2, which has a larger speed ratio than the input path T1; a planetary gearset of four elements, wherein the four elements are a first element, a second element, a third element and a fourth element following an order of elements on a speed diagram; a clutch C-2 transmitting a rotation from the input path T2 to the first element S3; a clutch C-1 transmitting the rotation from the input path T2 to the fourth element S2; a clutch C-4 transmitting a rotation from the input path T1 to the first element; a clutch C-3 transmitting the rotation from the input path T1 to the first second element C3; a brake B-1 engaging the fourth element; a brake B-2 engaging the second element, and an output member coupled with the third element R3.

Within the scope of DE 101 15 983 A1 by the Applicant, a multi-speed transmission is described comprising a drive shaft that is linked with a front-mounted gearset, an output shaft that is connected to a rear-mounted gearset, and a maximum of seven control elements, through the selective shifting of which at least seven forward gears can be shifted without range shifting. The front-mounted gearset is formed by a front-mounted planetary gearset or a maximum of two non-shiftable front-mounted planetary gearsets linked with the first front-mounted planetary gearset, wherein the rear-mounted gearset is configured as a two-carrier four-shaft transmission with two shiftable rear-mounted planetary gearsets and has four free shafts. The first free shaft of this two-carrier four-shaft transmission is linked with the first control element, the second free shaft with the second and third control elements, the third free shaft with the fourth and fifth control elements and the fourth free shaft is linked with the output shaft. According to the invention, a multi-step transmission with a total of six control elements is proposed, which connect the third free shaft or the first free shaft of the rear-mounted gearset additionally with a sixth control element. For a multi-step transmission with a total of seven control elements, according to the invention, it is proposed that the third free shaft is additionally connected to a sixth control element (D') and the first free shaft additionally to a seventh control element.

The scope of DE 101 15 987 by the Applicant describes a multi-step transmission with at least seven gears. In addition to the input shaft and output shaft, this transmission comprises a non-engageable upstream gear and an engageable downstream gear in the form of a two-fixed-link four-shaft transmission. The upstream gear comprises a first planetary gearset, which in addition to the input rotational speed of the input shaft also provides a second rotational speed, which may optionally be shifted to the downstream gear. The downstream gear comprises two engageable planetary gearsets, which can shift at least seven gears using the six control elements, forming two power paths. During each shifting operation, range shifting is advantageously avoided. A 9-gear multi-speed transmission is furthermore known from DE 29 36 969. It comprises eight control elements and four gearsets.

Automatic vehicle transmissions in planetary design in general have previously been described in the state of the art on many occasions and undergo continuous development and improvements. These transmissions should have, for example, a sufficient number of forward gears as well as one reverse gear and a gear ratio that is excellently suited for motor vehicles, having a high overall spread as well as favorable progressive ratios. Furthermore, they should allow a high starting gear ratio in the forward direction and include a direct gear and additionally be suited for use both in passenger cars and in commercial vehicles. In addition, these transmissions should have a low complexity, in particular require a small number of control elements, and avoid double-shifts when shifting sequentially, so that only one control element is always engaged when shifting in defined gear groups.

Therefore, it is the object of the present invention to propose a multi-speed transmission of the type mentioned above in which the design complexity is optimized and furthermore the efficiency in the main driving gears with regard to drag and gearing losses is improved. Moreover, it is intended that low torque acts on the control elements and planetary gearsets in the multi-speed transmission according to the invention and that the rotational speeds of the shafts, control elements and planetary gearsets be kept as low as possible. In addition, the required number of gears and spread of the gear ratios should also be maintained, implementing advantageously six forward gears and at least one reverse gear. Furthermore, the transmission according to the invention should be suitable for any design in a vehicle, particularly for a frontal-transverse configuration.

SUMMARY OF THE INVENTION

Accordingly, a multi-speed transmission having planetary design is proposed, which has one input shaft and one output shaft, which are arranged in a housing. Furthermore, at least three planetary gearsets (hereinafter referred to as the first, second and third planetary gearsets), at least six rotatable shafts (hereinafter referred to as the input shaft, output shaft, third, fourth, fifth and sixth shafts), and at least five control elements comprising brakes and clutches, are provided. The selective engagement of these components creates different gear ratios between the input shaft and the output shaft so that preferably six forward gears and one reverse gear can be shifted.

The input shaft can be detachably connected, via a clutch, to the sixth shaft, via a further clutch, to the third shaft and via yet a further clutch to the fourth shaft. The sixth shaft is permanently connected to the sun gear of the second planetary gearset and the sun gear of the third planetary gearset. Furthermore, the third shaft is permanently connected to the carrier of the second planetary gearset and the ring gear of the third planetary gearset, and can be coupled to the housing via a brake. The fourth shaft is permanently connected to the sun gear of the first planetary gearset and can be coupled to the housing via a further brake.

Furthermore, the fifth shaft is permanently connected to the carrier of the first planetary gearset and the ring gear of the second planetary gearset and the output shaft is permanently connected to the carrier of the third planetary gearset. According to the invention, the ring gear of the first planetary gearset is connected non-rotatably to the housing via a non-rotating shaft.

The configuration of the multi-speed transmission according to the invention produces suitable gear ratios particularly for passenger cars as well as a considerable increase of the total spread of ratios of the multi-speed transmission, resulting in improved driving comfort and a significant improvement in fuel economy.

In addition, the inventive multi-speed transmission allows a considerable decrease in complexity due to the low number of control elements, preferably two brakes and three clutches. The inventive multi-speed transmission advantageously makes it possible to start driving with a hydrodynamic converter, a hydrodynamic clutch, an external starting clutch or with other suitable external starting elements. It is also conceivable to allow a starting operation with a starting element integrated in the transmission. A control element is preferred, which is actuated in the first gear and in the reverse gear. In addition, good efficiency in the main driving gears with regard to drag and gearing losses can be achieved with the multi-speed transmission according to the invention.

Furthermore, low torque is present in the control elements and in the planetary gearsets of the multi-speed transmission, thus advantageously reducing wear of the multi-speed transmission. In addition, the low torque makes small dimensions possible, allowing reductions in the required installation space and the corresponding costs. Also, the rotational speeds of the shafts, control elements and planetary gearsets are low.

In addition, the transmission according to the invention is designed such that it can be adjusted to different drive train configurations, both in the direction of power flow and with regard to space.

BRIEF DESCRIPTION OF THE DRAWINGS

The invention will now be described, by way of example, with reference to the accompanying drawings in which.

DETAILED DESCRIPTION OF THE INVENTION

Figures 1, 2:
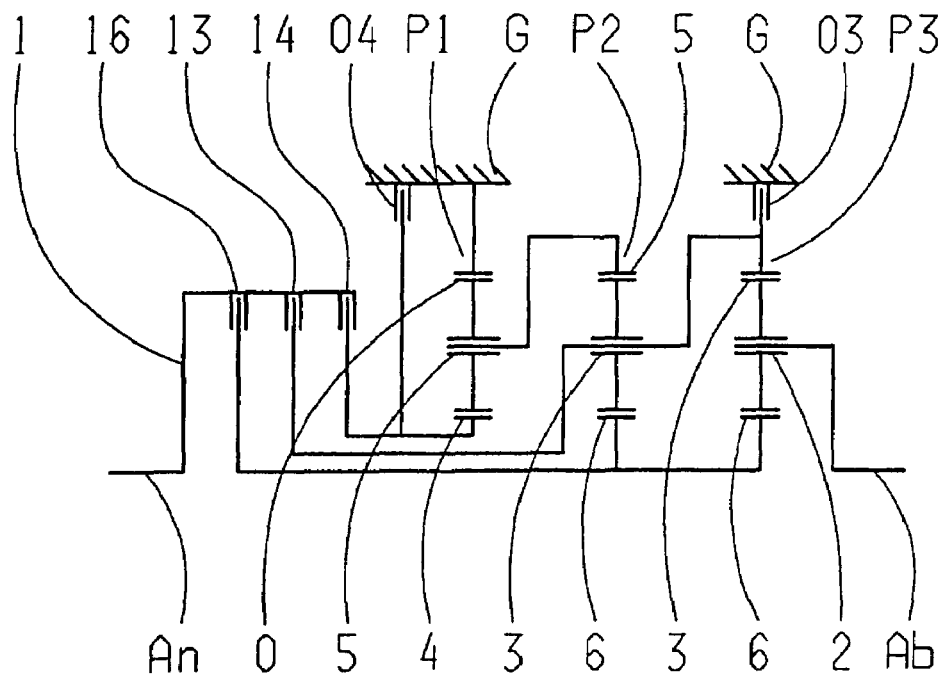
FIG. 1 is a schematic illustration of a preferred embodiment of a multi-speed transmission according to the invention.
FIG. 2 is an exemplary shifting diagram for the multi-speed transmission according to the invention as apparent from FIG. 1.
Figure 3:
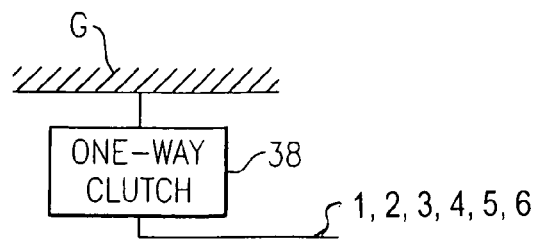
FIG. 3 is a diagrammatic view of the multi-speed transmission having a one-way clutch.
Figure 4:
FIG. 4 is a diagrammatic view of the inventive multi-speed transmission with an electric machine.
Figure 5:
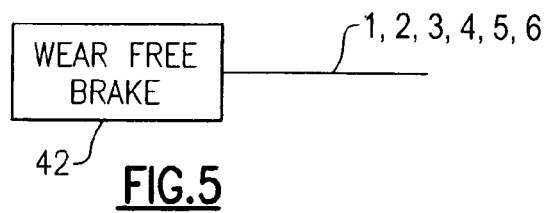
FIG. 5 is a diagrammatic view of the multi-speed transmission with a wear free brake.
Figure 6:
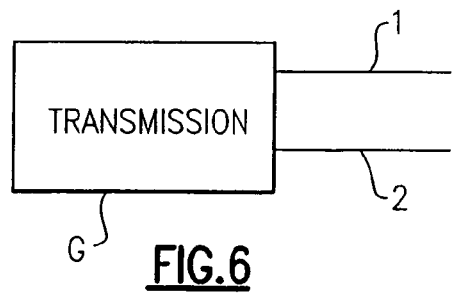
FIG. 6 is a diagrammatic view of the multi-speed transmission with the input and the output provided on the same side of the multi-speed transmission housing.
Figure 7:
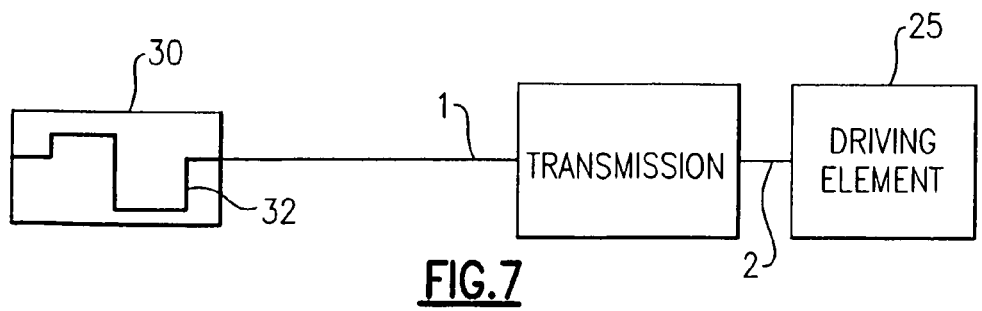
FIG. 7 is a diagrammatic view of the multi-speed transmission with the crankshaft of the drive motor fixed to the input shaft of the multi-speed transmission and the driving element located behind the multi-speed transmission.
Figure 8:
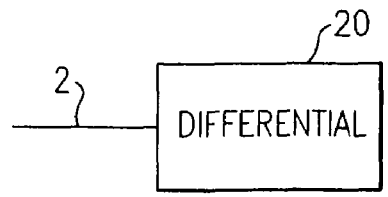
FIG. 8 is a diagrammatic view of the multi-speed transmission having a differential.
Figure 9:
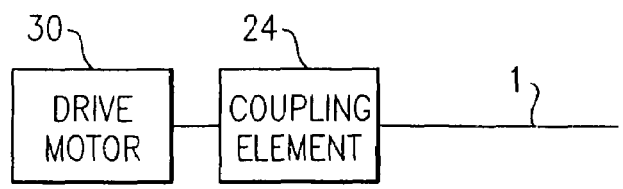
FIG. 9 is a diagrammatic view of the multi-speed transmission with a coupling element and a drive motor.
Figure 10:
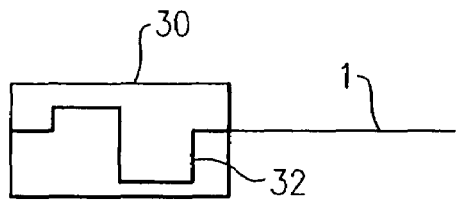
FIG. 10 is a diagrammatic view of the multi-speed transmission with a crankshaft of the drive motor fixed to an input shaft of the multi-speed transmission.
Figure 11:
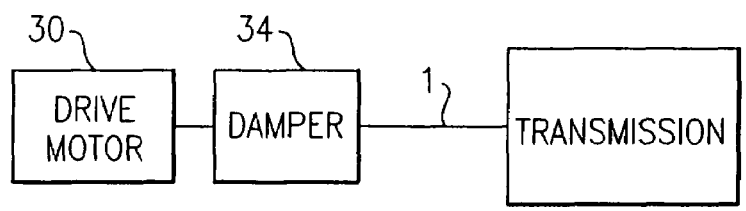
FIG. 11 is a diagrammatic view of the multi-speed transmission having the drive motor communicating with a damper.
Figure 12:
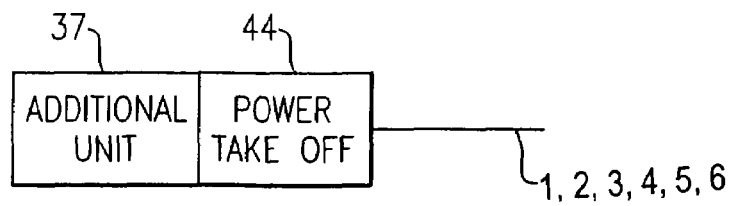
FIG. 12 is a diagrammatic view of the multi-speed transmission with a power take-off for driving an additional unit.

FIG. 1 shows a multi-speed transmission, according to the invention, comprising an input shaft 1 (An) and an output shaft 2 (Ab), which are arranged in a housing G. Three planetary gearsets P1, P2, P3 are provided, which are preferably configured as negative planetary gearsets and arranged in the sequence P1, P2, P3 in axial direction (and also in the direction of power flow).

As can be seen in FIG. 1, only five control elements, namely two brakes 03, 04 and three clutches 13, 14 and 16, are provided. With these control elements, a selective engagement of preferably six forward gears and one reverse gear can be implemented. The multi-speed transmission according to the invention has a total of six rotatable shafts, namely shafts 1, 2, 3, 4, 5 and 6.

As is apparent from FIG. 1, in the multi-speed transmission, it is provided that the input occurs via the shaft 1, which can be detachably connected via the clutch 16 to the shaft 6, via the clutch 13 to the shaft 3 and via the clutch 14 to the shaft 4. The shaft 6 is permanently connected to the sun gear of the second planetary gearset P2 and the sun gear of the third planetary gearset P3. The shaft 3 being permanently connected to the carrier of the second planetary gearset P2 and the ring gear of the third planetary gearset P3 and can be coupled to the housing G, via the brake 03. The shaft 4 is permanently connected to the sun gear of the first planetary gearset P1 and can be coupled to the housing G via the brake 04.

Furthermore, the shaft 5 is permanently connected to the carrier of the first planetary gearset P1 and the ring gear of the second planetary gearset P2. The output occurs via the shaft 2, which is permanently connected to the carrier of the third planetary gearset P3. In addition, the ring gear of the first planetary gearset P1 is non-rotatably connected to the housing G via a shaft 0.

Within the scope of the illustrated embodiments, the clutches 16, 13 and 14 are arranged before the first planetary gearset P1 in the sequence 16, 13, 14 from an axial point of view in the direction of power flow and may comprise a common outer disk carrier as the disk clutches.

The spatial arrangement of the control elements can be arbitrary and is only limited by the dimensions and design.

FIG. 2 exemplifies a shifting diagram of the multi-speed transmission, according to the invention as shown in FIG. 1. Two control elements are engaged for each gear. The shifting diagram shows a respective gear ratio i of the individual gear steps and a resulting exemplary progressive ratio phi. Typical stationary gear ratio values of the planetary gearsets P1, P2, P3 are −1.750, −2.476 and −2.520, respectively. The shifting diagram also shows that double shifts and/or range shifts are avoided when shifting sequentially because two adjoining gear steps have one common control element engaged. It is preferable if the fourth gear is configured as a direct gear.

The first gear results from engaging the brake 03 and the clutch 16; the second gear from engaging the brake 04 and the clutch 16, and the third gear from engaging the clutches 14 and 16. Furthermore, the fourth gear results from engaging the clutch 13 and the clutch 16; the fifth gear from engaging the clutches 13 and 14, and the sixth gear from engaging the brake 04 and the clutch 13. As the shifting diagram illustrates, the reverse gear results from engaging the brake 03 and the clutch 14.

According to the invention, starting with an integrated control element 03, 16 is possible (IAK), for which the brake 03 is particularly suited and is required in the first gear and the reverse gear. Furthermore, depending on the shifting logic, different gear steps may be obtained from the same gear pattern, allowing application and/or vehicle-specific variations.

In addition, it is possible to provide additional one-way clutches in suitable locations of the multi-speed transmission, for example, between a shaft and the housing or optionally connecting two shafts.

On the input side or output side, an axle differential and/or a transfer case differential may be provided according to the invention.

Within the scope of a further embodiment, the input shaft 1 may be separated from the driving motor, as needed, by a coupling element, where the coupling element may be a hydrodynamic converter, a hydraulic clutch, a dry starting clutch, a wet starting clutch, a magnetic powder clutch or a centrifugal clutch. It is also possible to arrange such a driving element in the direction of power flow behind the transmission where, in this case, the input shaft 1 is permanently connected to the crankshaft of the engine.

The multi-speed transmission, according to the invention, also allows the arrangement of a torsional vibration damper between the engine and transmission.

Within the scope of a further embodiment of the invention (not shown), a wear-free brake, such as a hydraulic retarder or an electric retarder or the like, may be arranged on the input shaft 1 or output shaft 2, which is particularly important when the transmission is used in commercial vehicles. Moreover, a power take-off may be provided on each shaft, preferably on the input shaft 1 or the output shaft 2, to drive additional units.

The control elements used may be configured as powershift clutches or brakes. In particular, power-shift clutches or brakes, such as multi-disk clutches, band brakes and/or cone clutches may be used. Furthermore, it is also possible to use positive brakes and/or clutches, such as synchronization devices or claw clutches as control elements.

A further advantage of the multi-speed transmission presented here is that an electric machine can be arranged on each shaft as a generator and/or as an additional drive unit.

Of course, any design configuration, particularly any spatial arrangement of the planetary gearsets and the control elements as such, as well as in relation to each other to the extent they are technically expedient, falls under the scope of protection of the present claims, without influencing the function of the transmission as described in the claims, even if these embodiments are not explicitly illustrated in the Figures or mentioned in the description.

REFERENCE NUMERALS 0 shaft
1 shaft
2 shaft
3 shaft
4 shaft
5 shaft
6 shaft
03 brake
04 brake
13 clutch
14 clutch
16 clutch
IAK integrated control element
P1 planetary gearset
P2 planetary gearset
P3 planetary gearset
An input
Ab output i gear ratio
phi progressive ratio
G housing

The invention claimed is:

1. A multi-speed transmission of a planetary design for an automatic transmission of a motor vehicle, the transmission comprising:
   an input shaft (1) and an output shaft (2) which are arranged in a housing (G);
   first, second and third planetary gear sets (P1, P2, P3), and each of the first, the second and the third planetary gear sets (P1, P2, P3) comprising a sun gear, a carrier and an internal gear;
   at least third, fourth, fifth and sixth rotatable shafts (3, 4, 5, 6) as well as at least five control elements (03, 04, 13, 14, 16), comprising first and second brakes (03, 04) and first, second and third clutches (13, 14, 16), whose selective engagement creates different gear ratios between the input shaft (1) and the output shaft (2) so that at least six forward gears and one reverse gear can be implemented;
   wherein the input shaft (1) is detachably connectable, via the third clutch (16), to the sixth shaft (6), via the first clutch (13), to the third shaft (3) and, via the second clutch (14), to the fourth shaft (4);
   the sixth shaft (6) is permanently connected to the sun gear of the second planetary gear set (P2) and the sun gear of the third planetary gear set (P3);
   the third shaft (3) is permanently connected to the carrier of the second planetary gear set (P2) and the internal gear of the third planetary gear set (P3) and is couplable to the housing (G), via the first brake (03);
   the fourth shaft (4) is permanently connected to the sun gear of the first planetary gear set (P1) and is couplable to the housing (G), via the second brake (04);
   the fifth shaft (5) is permanently connected to the carrier of the first planetary gear set (P1) and the internal gear of the second planetary gear set (P2);
   the output shaft (2) is permanently connected to the carrier of the third planetary gear set (P3); and
   the internal gear of the first planetary gear set (P1) is fixedly connected to the housing (G).

2. The multi-speed transmission according to claim 1, wherein the first, the second and the third planetary gear sets (P1, P2, P3) are arranged, in a direction of power flow, in the following sequential order:
   the first planetary gear set (P1), the second planetary gear set (P2) and the third planetary gear set (P3).

3. The multi-speed transmission according to claim 1, wherein the first, the second and the third planetary gear sets (P1, P2, P3) are minus planetary gear sets.

4. The multi-speed transmission according to claim 1, wherein the first, the second and the third clutches (13, 14, 16) are all arranged in front of the first planetary gear set (P1), in a direction of power flow, in the following sequential order:
   the third clutch (16), the first clutch (13) and the second clutch (14).

5. The multi-speed transmission according to claim 1, wherein the first, the second and the third clutches (16, 13, 14) have a common outer disk carrier.

6. The multi-speed transmission according to claim 1, wherein a first gear results from engaging the first brake (03) and the third clutch (16), a second gear results from engaging the second brake (04) and third clutch (16), a third gear results from engaging the second and the third clutches (14 and 16), a fourth gear results from engaging the first clutch (13) and the third clutch (16), a fifth gear results from engaging the first and the second clutches (13 and 14), and a sixth gear results from engaging the second brake (04) and the first clutch (13).

7. The multi-speed transmission according to claim 1, wherein the reverse gear results from engaging the first brake (03) and the second clutch (14).

8. The multi-speed transmission according to claim 1, wherein at least one-way clutch is provided within the transmission at a suitable location.

9. The multi-speed transmission according to claim 8, wherein the at least one-way clutch is provided between one of the input shaft (1), the output shaft (2), the third, the fourth, the fifth and the sixth rotatable shafts (3, 4, 5, 6) and the housing (G).

10. The multi-speed transmission according to claim 1, wherein the input and the output shafts (1, 2) are located on a common side of the housing (G).

11. The multi-speed transmission according to claim 1, wherein one of an axle differential and a transfer case are provided on one of an input side and an output side of the transmission.

12. The multi-speed transmission according to claim 1, wherein a coupling element facilitates separation of the input shaft (1) from a driving motor.

13. The multi-speed transmission according to claim 12, wherein the coupling element is one of a hydrodynamic converter, a hydraulic clutch, a dry starting clutch, a wet starting clutch, a magnetic powder clutch and a centrifugal clutch.

14. The multi-speed transmission according to claim 1, wherein an external driving element is arranged downstream of the transmission, in a direction of power flow, and the input shaft (1) is firmly connected to a crankshaft of a driving motor.

15. The multi-speed transmission according to claim 1, wherein starting occurs via one of the five control element (03, 16) of the transmission, and the input shaft (1) is permanently connected to a crankshaft of a driving motor.

16. The multi-speed transmission according to claim 1, wherein a torsional vibration damper is arranged between a driving motor and the transmission.

17. The multi-speed transmission according to claim 1, wherein a wear-free brake is arranged on at least one of the input shaft (1), the output shaft (2), the third, the fourth, the fifth and the sixth rotatable shafts (3, 4, 5, 6).

18. The multi-speed transmission according to claim 1, wherein a power take-off is provided on at least one of the input shaft (1), the output shaft (2), the third, the fourth, the fifth and the sixth rotatable shafts (3, 4, 5, 6) for driving an additional unit.

19. The multi-speed transmission according to claim 18, wherein the power take-off is arranged on one of the input shaft (1) and the output shaft (2).

20. The multi-speed transmission according to claim 1, wherein the five control elements are one of power-shift clutches and power-shift brakes.

21. The multi-speed transmission according to claim 20, wherein the five control elements are one of multi-disk clutches, band brakes and cone clutches.

22. The multi-speed transmission according to claim 1, wherein the five control elements are one of positive brakes and positive clutches.

23. The multi-speed transmission according to claim 1, wherein an electric machine is arranged on at least one of the input shaft (1), the output shaft (2), the third, the fourth, the fifth and the sixth rotatable shafts (3, 4, 5, 6) as one of a generator and an additional driving unit.

* * * * *